(12) United States Patent
Greene

(10) Patent No.: US 7,418,814 B1
(45) Date of Patent: Sep. 2, 2008

(54) DUAL EXPANDER CYCLE ROCKET ENGINE WITH AN INTERMEDIATE, CLOSED-CYCLE HEAT EXCHANGER

(75) Inventor: William D. Greene, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 537 days.

(21) Appl. No.: 11/172,666

(22) Filed: Jun. 30, 2005

(51) Int. Cl.
*F02K 9/48* (2006.01)
(52) U.S. Cl. ............................... 60/204; 60/259; 60/260
(58) Field of Classification Search .................. 60/204, 60/206, 257, 259, 260, 267
See application file for complete search history.

(56) References Cited

U.S. PATENT DOCUMENTS

| | | |
|---|---|---|
| 3,768,254 A | 10/1973 | Stuart |
| 4,220,001 A * | 9/1980 | Beichel ............... 60/259 |
| 4,583,362 A | 4/1986 | Wagner |
| 4,589,253 A | 5/1986 | Wagner |
| 5,101,622 A | 4/1992 | Bond |
| 5,410,874 A | 5/1995 | Limerick |
| 5,636,512 A | 6/1997 | Culver |
| 5,867,980 A | 2/1999 | Bartos |
| 5,873,239 A | 2/1999 | Culver |
| 5,918,460 A | 7/1999 | Connell et al. |
| 6,052,987 A | 4/2000 | Dressler |
| 6,226,980 B1 | 5/2001 | Katorgin et al. |
| 6,470,670 B2 | 10/2002 | Maeding |
| 6,619,031 B1 | 9/2003 | Balepin |
| 6,769,242 B1 | 8/2004 | Balepin |
| 2004/0026572 A1 | 2/2004 | Burton |
| 2004/0131138 A1 | 7/2004 | Correia et al. |
| 2004/0177603 A1 | 9/2004 | Hewitt |

FOREIGN PATENT DOCUMENTS

| | | |
|---|---|---|
| EP | 0362053 | 4/1990 |
| FR | 2837242 | 9/2003 |

* cited by examiner

*Primary Examiner*—Louis J Casaregola
(74) *Attorney, Agent, or Firm*—James J. McGroary; Peter J. Van Bergen

(57) ABSTRACT

A dual expander cycle (DEC) rocket engine with an intermediate closed-cycle heat exchanger is provided. A conventional DEC rocket engine has a closed-cycle heat exchanger terhamlly coupled thereto. The heat exchanger utilizes heat extracted from the engine's fuel circuit to drive the engine's oxidizer turbomachinery.

11 Claims, 2 Drawing Sheets

Figure 1:
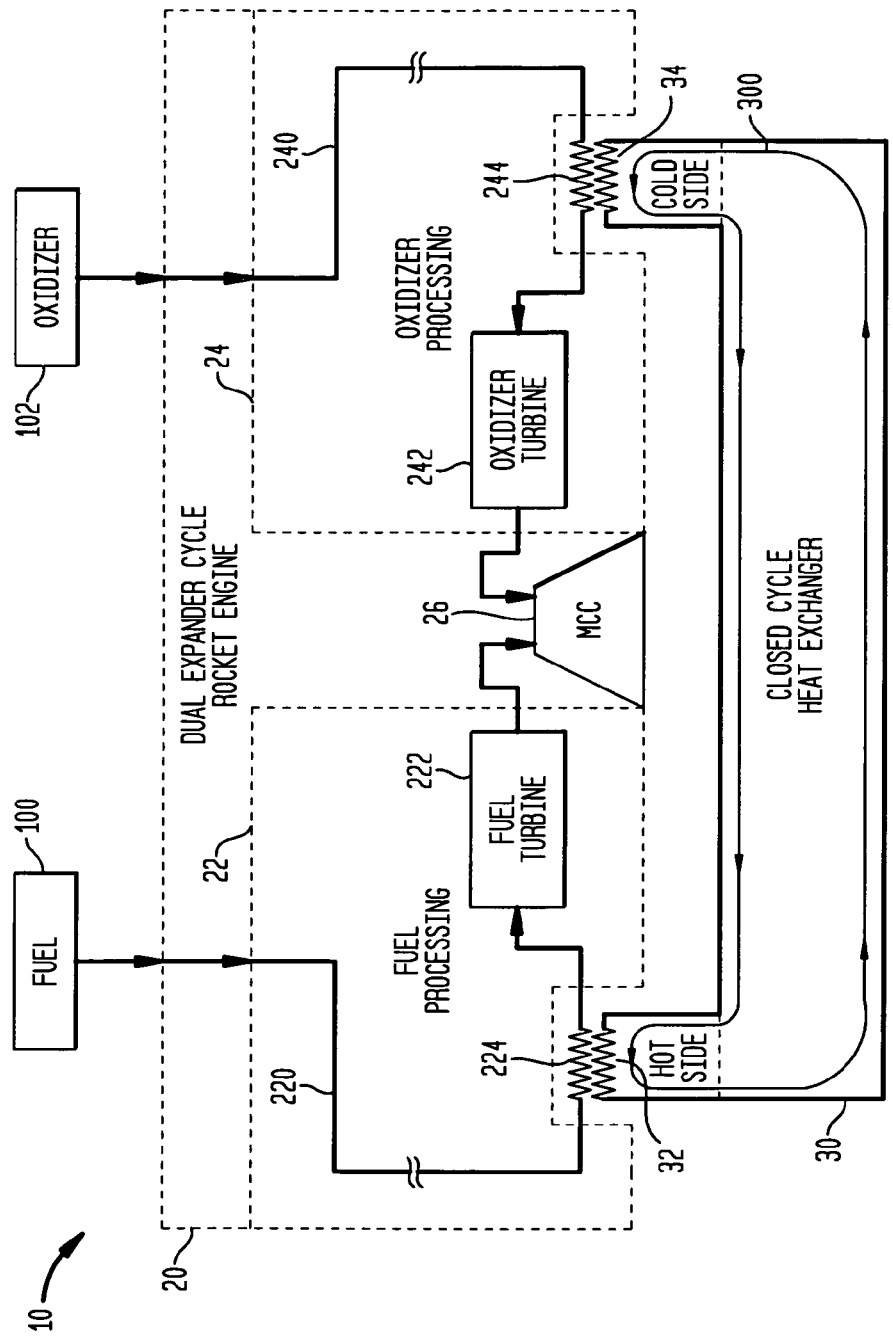

DUAL EXPANDER CYCLE ROCKET ENGINE WITH AN INTERMEDIATE, CLOSED-CYCLE HEAT EXCHANGER

ORIGIN OF THE INVENTION

The invention was made by an employee of the United States Government and may be manufactured and used by or for the Government for governmental purposes without the payment of any royalties.

BACKGROUND OF THE INVENTION

1. Field of the Invention

This invention relates to rocket engines. More specifically, the invention is dual expander cycle type of rocket engine that incorporates a closed-cycle heat exchanging unit as a means to safely, efficiently and reliably drive the engine's turbomachinery.

2. Description of the Related Art

A well known upper stage rocket engine is the expander cycle rocket engine that runs on a fuel/oxidizer propellant combination. The expander cycle is based upon the concept that the engine's turbomachinery are driven with gases warmed through regenerative cooling of the engine's thrust chamber assembly. The expander cycle engine eliminates the need for secondary combustion zones such as gas generators or pre-burners.

The propellant combination most suitable for upper-stage, expander cycle rocket engine use is the hydrogen/oxygen combination due to its high specific impulse. Unfortunately, there are large differences in fluid densities when these propellants are used in their cryogenic forms as is generally the case. Typically, the differing densities necessitate the use of centrifugal pumps that must be run at substantially different speeds. The different pump speeds are achieved by using a single turbopump unit and a mechanical gearbox arrangement that allows the single unit to operate two pump shafts at two different speeds. However, the mechanical nature of a gearbox makes the single turbopump/gearbox arrangement susceptible to reliability issues. Thus, the signal turbopump/gearbox embodiment of the expander cycle rocket engine is not an optimal design option.

Another approach to the differing densities problem associated with the hydrogen/oxygen propellant combination is to use two turbopump units with each unit operating at a different speed. In the most typical design, heated hydrogen gas is used to drive both of the turbopumps. However, within the oxygen turbopump, a complicated purged seal must be provided to keep the oxygen and hydrogen separated from one another to thereby avoid a catastrophic failure/explosion. Thus, this approach is inherently risky and is also not an optimal design option.

Still another approach to the differing densities problem associated with the hydrogen/oxygen propellant combination is to use what is called a dual expander cycle engine. In this design, warmed hydrogen gas is used to drive the hydrogen turbopump and warmed oxygen is used to drive the oxidizer turbopump. The fundamental drawback of this embodiment of the expander cycle is that separate thrust chamber cooling circuits (i.e., one for hydrogen and one for oxygen) are necessary in order to generate the necessary turbopump drive gases. Unfortunately, he inclusion of two separate cooling circuits is difficult to incorporate into an actual rocket system due to weight considerations. Further, there is inherent risk in using oxygen as a coolant since there is potential for catastrophic failure resulting from coolant jacket leaks. For these reasons, this particular embodiment of the expander cycle engine is not an optimal design option.

SUMMARY OF THE INVENTION

Accordingly, it is an object of the present invention to provide a rocket engine and method of operating same that is efficient, safe and reliable.

Another object of the present invention is to provide a dual expander cycle type of rocket engine and method of operating same that allows the rocket engine's turbines to be operated efficiently, safely and reliably.

Other objects and advantages of the present invention will become more obvious hereinafter in the specification and drawings.

In accordance with the present invention, a rocket engine and method of operating same are provided. A dual expander cycle (DEC) rocket engine defines a fuel path and an oxidizer path therethrough with the fuel path and oxidizer path terminating at a main combustion chamber. The fuel path incorporates a fuel turbine having an input side and the oxidizer path incorporating an oxidizer turbine having an input side. A closed-cycle heat exchanger (e.g., a Brayton cycle heat exchanger) has (i) a hot side thermally coupled to the fuel path at a location forward of the fuel turbine's input side of said fuel turbine, and (ii) a cold side thermally coupled to the oxidizer path at a location forward of the oxidizer turbine's input side. The heat exchanger extracts heat from the fuel and supplies heat to the oxidizer.

BRIEF DESCRIPTION OF THE DRAWING(S)

Figure 2:
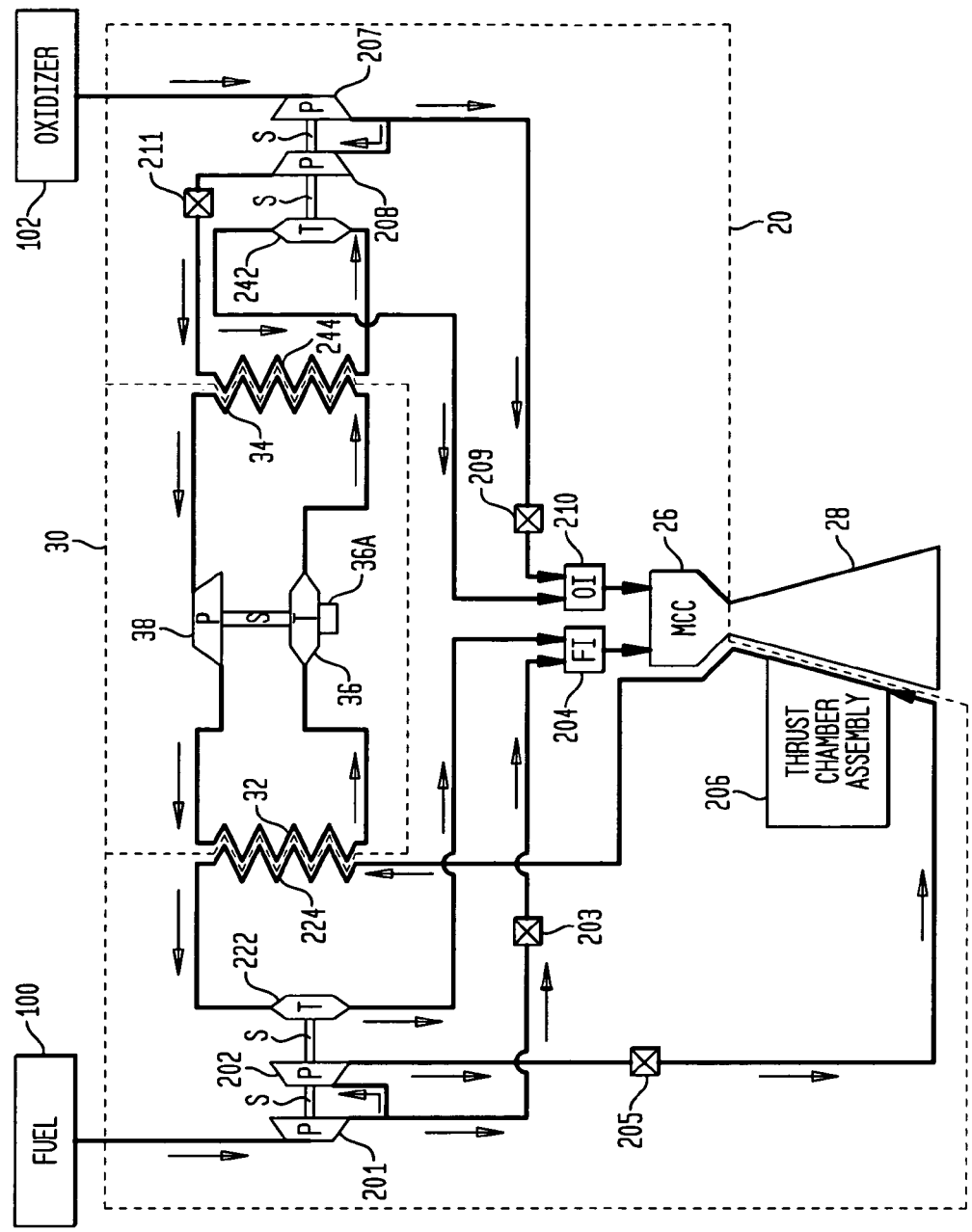

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a schematic of a dual expander cycle rocket engine with an intermediate closed-cycle heat exchanger in accordance with the present invention; and FIG. 2 is a schematic of a dual expander cycle rocket engine incorporating a Brayton cycle heat exchanger in accordance with an embodiment of the present invention.

DESCRIPTION OF THE PREFERRED EMBODIMENT(S)

Referring now to the drawings, and more particularly to FIG. 1, a dual expander cycle rocket engine with an intermediate closed-cycle heat exchanger in accordance with the present invention is shown and is referenced generally by numeral 10. Rocket engine 10 is configured to operate with a fuel/oxidant propellant combination such as the well known hydrogen/oxygen combination. Typically, both a fuel 100 and oxidizer 102 are supplied to rocket engine 10 in a cryogenic form as this is generally necessary for spacecraft storage volume considerations.

Rocket engine 10 includes a conventional dual expander cycle (DEC) rocket engine 20 and a closed-cycle heat exchanger 30 thermally coupled to DEC rocket engine 20 as will be explained further below. The exact configuration and construction of DEC rocket engine 20 are not limitations of the present invention. However, in general, DEC rocket engine 20 includes a fuel processing section 22 and an oxidizer processing section 24. Fuel processing section 22 includes various elements disposed along a fuel path 220 where fuel 100 is prepared for ultimate injection into the DEC rocket engine's main combustion chamber (MCC) 26. Similarly, oxidizer processing section 24 includes various elements disposed along an oxidizer path 240 where oxidizer 102 is prepared for ultimate injection into MCC 26. The particular elements and arrangement thereof along each of paths 220 and 240 can be realized in a variety of ways. However, in general, fuel path 220 will include a fuel turbine 222 with the fuel output of fuel turbine 222 being injected into MCC 26, and oxidizer path 240 will include an oxidizer turbine 242 with the oxidizer output of oxidizer turbine 242 being injected into MCC 26.

In accordance with the present invention, fuel path 220 just prior to fuel turbine 222 defines a section 224 that provides for the thermal coupling of fuel path 220 to heat exchanger 30. More specifically, thermal coupling section 224 provides for thermal coupling to a hot side 32 of heat exchanger 30. In a similar fashion, oxidizer path 240 just prior to oxidizer turbine 242 defines a section 244 that provides for the thermal coupling of oxidizer path 240 to a cold side 34 of heat exchanger 30.

Heat exchanger 30 is a closed-cycle device/system defining a closed-cycle path 300 therethrough in which a fluid flows that is inert with respect to fuel 100 and oxidizer 102. Since fuel 100 and oxidizer 102 will typically be hydrogen and oxygen, respectively, suitable inert fluids could include, but are not limited to, nitrogen, helium, argon, xenon and neon. One well known closed cycle heat exchanger is the Brayton cycle heat exchanger.

As is well known in the art, fuel processing section 22 heats fuel 100 along path 220 to very high temperatures before fuel 100 is supplied to fuel turbine 222. The heating is typically achieved by passing fuel 100 through the cooling jacket of the engine's thrust chamber (i.e., the engine's combustion chamber and nozzle extension). In the present invention, these very high temperatures are coupled to the insert fluid flowing through closed-cycle path 300 via the thermal coupling between section 224 and hot side 32 of heat exchanger 30. The amount of heat transfer should be sufficient to energize the inert fluid in path 300 while keeping fuel 100 heated enough to drive fuel turbine 222. Thus, the design of section 224 and hot side 32 must take into consideration and balance factors such as operational requirements of fuel turbine 222, heat transfer energy requirements for operation of heat exchanger 30, and the efficiency of the thermal coupling between section 224 and hot side 32.

In terms of oxidizer processing, DEC rocket engine 20 must be capable of energizing oxidizer 102 sufficiently to drive oxidizer turbine 242. The present invention energizes oxidizers 102 in oxidizer path 240 by transferring heat energy to oxidizer 102 via the thermal coupling between cold side 34 and section 244. More specifically, a large fraction of the energy of the inert fluid traveling along path 300 that is picked up at hot side 32 is transferred to oxidizer 102 at section 244. The heat transfer should be sufficient to energize oxidizer 102 to allow for the operation of oxidizer turbine 242. Accordingly, the design of section 244 and cold side 34 must take into consideration factors such as operational requirements of oxidizer turbine 242, heat transfer energy requirements for operation of heat exchanger 30, and the efficiency of the thermal coupling between section 244 and cold side 34.

As noted above, the configuration and construction of both DEC rocket engine 20 and heat exchanger 30 could be realized in a variety of ways without departing from the scope of the present invention. However, by way of illustrative example, an embodiment of the present invention will be described herein with reference to FIG. 2 where pump elements are designated "P", turbine elements are designated "T", connecting rotating shaft elements are designated "S", and directions of fuel or oxidizer flow are indicated with arrows. To facilitate an understanding of the illustrated embodiment, dashed lines are used to delineate DEC rocket engine 20 from heat exchanger 30.

With respect of fuel processing, fuel 100 is supplied to a primary pump 201. Some of the output of primary pump 201 is fed to a kick pump 202 an some is fed to a main fuel valve 203. The portion of fuel 100 passing through main fuel valve 203 is sent to a fuel injector ("FI") 204 that supplies fuel 100 to MCC 26. The portion of fuel 100 directed through kick pump 202 is sent through a coolant valve 205. The portion of fuel 100 passed through coolant valve 205 is sent through a regeneratively cooled thrust chamber assembly 206 that is thermally coupled to a thrust nozzle 28 coupled to MCC 26. Fuel 100 is heated to high temperatures at thrust chamber assembly 206. Heated fuel 100 exiting thrust chamber assembly 206 is then directed to thermal coupling section 224. As previously explained, fuel 100 exiting section 224 still has sufficient energy to drive fuel turbine 222, the exhaust of which is supplied to fuel injector 204.

With respect to oxidizer processing, oxidizer 102 is supplied to a primary pump 207. Some of the output of primary pump 207 is fed to a kick pump 208 and some is fed to a main oxidizer valve 209. The portion of oxidizer 102 passing through main oxidizer valve 209 is sent to an oxidizer injector ("OI") 210 that supplies oxidizer 102 to MCC 26. The portion of oxidizer 102 directed through kick pump 208 flows through an oxidizer drive valve 211 and on to section 244 for thermal coupling to cold side 34 of heat exchanger 30. As previously explained, heat is transferred to oxidizer 102 as it flows through section 244. The energy increase in oxidizer 102 drives oxidizer turbine 242. The exhaust from oxidizer turbine 242 is directed to oxidizer injector 210. The fuel and oxidizer are injected by injectors 204 and 210, respectively, into MCC 26 where they combust with the resulting exhaust exiting nozzle 28.

When heat exchanger 30 is a Brayton cycle heat exchanger, the inert fluid flowing therethrough gains energy at hot side 32. The increased energy drives a Brayton cycle turbine 36. The exhaust from turbine 36 is supplied to cold side 34 where heat energy is transferred to oxidizer 102 (as explained above) thereby cooling the inert fluid moving through cold side 34. The cooled inert fluid is then pumped up to a high pressure by a Brayton cycle pump 38.

The advantages of the present invention are numerous. The invention eliminates the possibility of catastrophic failure inherent in the design of expander cycle engines by eliminating the need to use fuel to drive the oxidizer's turbomachinery. That is, there is no single-point propellant leak or purged-seal failure that could bring about a catastrophic engine failure. When the present invention uses a Brayton cycle heat exchanger, there is the added advantage that the Brayton cycle can operate at elevated pressures and potentially high fluid velocities, i.e., the Brayton cycle possesses high heat transfer coefficients. This allows the exchange of energy at both the hot and cold sides to the heat exchanger to be accomplished efficiently.

Although the invention has been described relative to a specific embodiment thereof, there are numerous variations and modifications that will be readily apparent to those skilled in the art in light of the above teachings. For example, instead of using a split-expander configuration employing kick stages in both the fuel and oxidizer pumping mechanisms, either or both sides could employ a full flow configuration without kick pumps. The inert fluid used within the heat exchanger could be any suitable fluid. Still further, the Brayton cycle's turbomachinery could be used to drive an electric generator to produce electric power if that was advantageous for the vehicle stage. Accordingly, a coupling 36A can be provided on turbine 36 (FIG. 2) to allow an electric generator (not shown) to be coupled thereto. The coupling of an electric generator to a turbine is well understood in the art. It is therefore to be understood that, within the scope of the appended claims, the invention may be practiced other than as specifically described.

What is claimed as new and desired to be secured by Letters Patent of the United States is:

1. A rocket engine, comprising:
    a dual expander cycle rocket engine adapted to have a fuel and an oxidizer supplied thereto, said dual expander cycle rocket engine including a fuel turbine and an oxidizer turbine; and
    a heat exchanger thermally coupled to said dual expander cycle rocket engine for cooling the fuel that enters said fuel turbine and for heating the oxidizer that enters said oxidizer turbine.

2. A rocket engine as in claim 1 wherein said heat exchanger includes a turbine adapted to have an electric generator coupled thereto.

3. A rocket engine as in claim 1 wherein said heat exchanger has a fluid circulating therethrough that is inert with respect to the fuel and the oxidizer.

4. A rocket engine as in claim 1 wherein said heat exchanger has a fluid circulating therethrough that is selected from the group consisting of nitrogen, helium, xenon, argon and neon.

5. A rocket engine, comprising:
    a dual expander cycle rocket engine that defines a fuel path and an oxidizer path therethrough wherein said fuel path and said oxidizer path terminate at a main combustion chamber, said fuel path incorporating a fuel turbine heaving an input side and said oxidizer path incorporating an oxidizer turbine having an input side; and
    a closed cycle heat exchanger having a hot side and a cold side, said hot side thermally coupled to said fuel path at a location therealong forward of said input side of said fuel turbine, said cold side thermally coupled to said oxidizer path at a location therealong forward to said input side of said oxidizer turbine.

6. A rocket engine as in claim 5 wherein said heat exchanger includes a turbine adapted to have an electric generator coupled thereto.

7. A rocket engine as in claim 5 wherein said closed cycle heat exchanger has a fluid circulating therethrough that is inert with respect to the fuel and the oxidizer.

8. A rocket engine as in clime 5 wherein said closed cycle heat exchanger has a fluid circulating therethrough that is selected from the group consisting of nitrogen, helium, xenon, argon and neon.

9. A method of operating a rocket engine, comprising the steps of:
    providing a dual expander cycle rocket engine that defines a fuel path and an oxidizer path therethrough wherein the fuel path and oxidizer path terminate at a main combustion chamber, the fuel path incorporating a fuel turbine having an input side and the oxidizer path incorporating an oxidizer turbine having an input side;
    cooling the fuel that flows through the fuel path just prior to the fuel entering the fuel turbine using heat exchange with a fluid that is inert with respect to the fuel and the oxidizer; and
    heating the oxidizer that flows through the oxidizer path just prior to the oxidizer entering the oxidizer turbine using heat exchanger with the fluid.

10. A method according to claim 9 wherein said steps of cooling and heating comprise the step of thermally coupling a heat exchanger to the dual expander cycle rocket engine, wherein the fluid that is inert with respect to the fuel and the oxidizer circulates through the heat exchanger.

11. A method according to claim 10 wherein said step of thermally coupling comprises the steps of:
    thermally coupling a hot side of the heat exchanger to the fuel path at a location therealong forward of the input side of the fuel turbine; and
    thermally coupling a cold side of the heat exchanger to the oxidizer path at a location therealong forward of the input side of the oxidizer turbine.

* * * * *